United States Patent [19]
Brenner

[11] Patent Number: 6,161,559
[45] Date of Patent: Dec. 19, 2000

[54] SEPARATOR FOR CURABLE MATERIAL INCLUDING LIQUID

[76] Inventor: Horst Brenner, Steinbeisstrasse 2, 71717 Beilstein, Germany

[21] Appl. No.: 09/231,444

[22] Filed: Jan. 14, 1999

[30] Foreign Application Priority Data

| Jan. 14, 1998 | [DE] | Germany | 198 01 067 |
| Jan. 14, 1998 | [DE] | Germany | 198 01 068 |
| Jan. 14, 1998 | [DE] | Germany | 198 01 069 |

[51] Int. Cl.$^7$ ........................................ B08B 3/04
[52] U.S. Cl. ...................... 134/65; 134/107; 134/132; 209/173
[58] Field of Search ............... 134/65, 132, 107; 366/320, 322, 323; 209/172, 172.5, 173

[56] References Cited

U.S. PATENT DOCUMENTS

| 787,108 | 4/1905 | Oliver | 134/65 X |
| 1,264,135 | 4/1918 | Alderson | 366/322 X |
| 1,909,159 | 5/1933 | Ashmead | 209/172 |
| 3,498,839 | 3/1970 | Mehta | 134/65 X |
| 5,950,839 | 9/1999 | Wedel | 209/173 |

FOREIGN PATENT DOCUMENTS 679166   9/1952   United Kingdom ................... 209/173

Primary Examiner—Philip R. Coe
Attorney, Agent, or Firm—Ostrolenk, Faber, Gerb & Soffen, LLP

[57] ABSTRACT

A separator for separating curable material including liquid, especially residual concrete, residual mortar and the like, having a conveying screw which is disposed in a receiving trough. The rotary axle of the conveying screw extends transversely to the horizontal. The conveying screw increases in diameter, starting from its lower upstream end, and the section of the floor of the receiving trough, which is assigned to the enlarged region of the conveying screw, extends essentially horizontally. The screw has a second following section of decreasing diameter. The floor section at that the second screw section is inclined transversely to the horizontal. An additional screw conveyor may be attached beyond the second section. In an alternate embodiment, the screw has two cylindrical sections of different diameter. A transfer bucket wheel moves material between come of the screw sections.

17 Claims, 3 Drawing Sheets

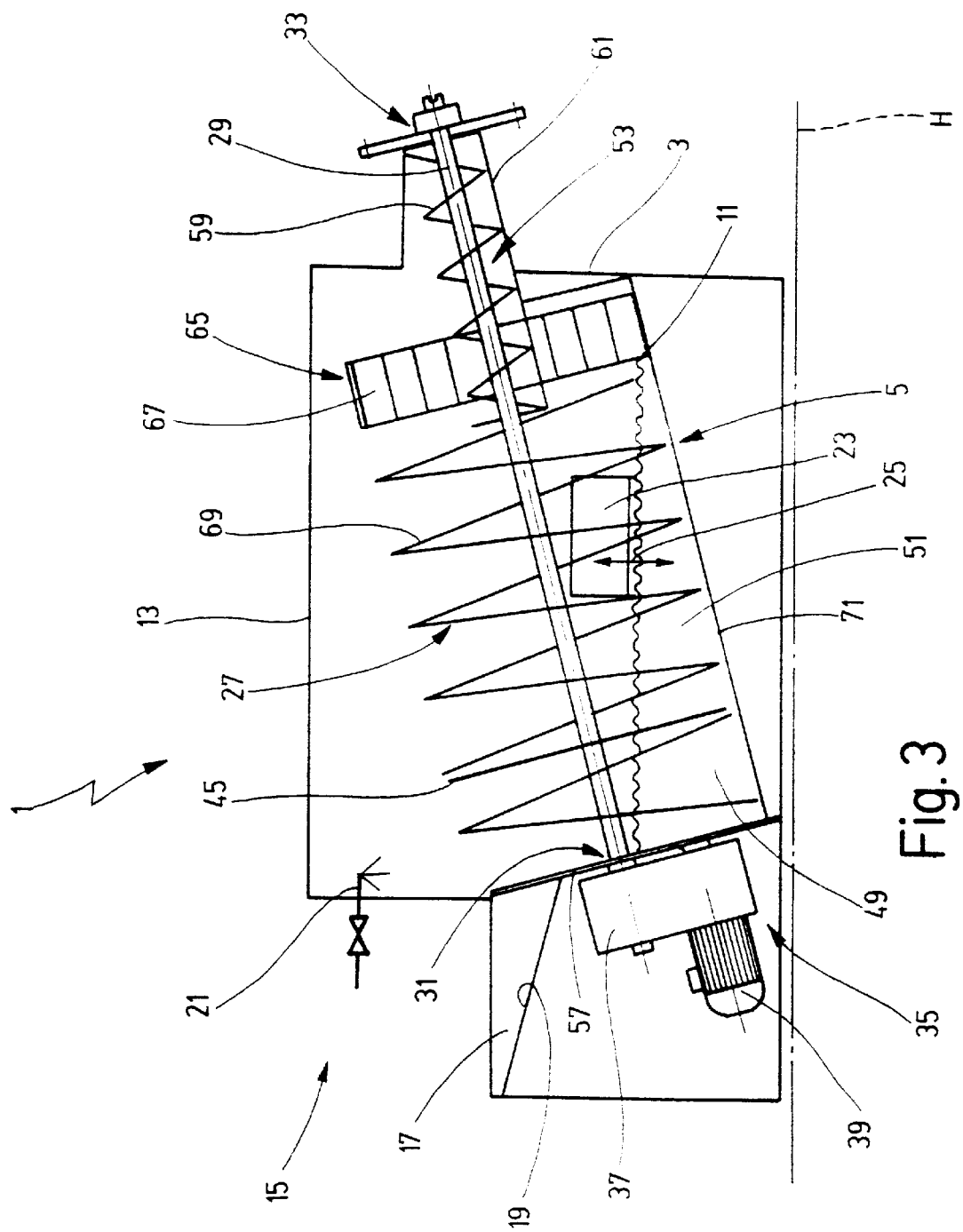

SEPARATOR FOR CURABLE MATERIAL INCLUDING LIQUID

BACKGROUND OF THE INVENTION

The invention relates to a separator for separating curable material including liquid, especially residual concrete, residual mortar and the like, using a conveying screw in a trough, and particularly relates to the conveying screw and trough design.

Apparatus of the type mentioned here are employed, for example, in ready-mix concrete plants. They take up unset residues of curable material, such as concrete, mortar and the like, and subject the material to extractive washing using a liquid, so that the individual components of the washed material can be returned to the production process. For this purpose the material is introduced into the separator, where it is separated from the cement paste by use of water. Material which has been washed out, for example, sand, gravel and the like, is conveyed out of the separator by mechanical means and is temporarily stored in a material box. The water that extractively washed the material is introduced from the separator into a container, which is preferably provided with a circulation apparatus in order to prevent settling of the fines and of the cement paste. The wash water can likewise be reused to produce fresh concrete, mortar, and the like.

DE 39 28 528 C2 discloses a separator of this type comprising a cylindrical transport screw which is disposed in a receiving trough having a floor which runs parallel to the horizontal. The aggregates which have been washed out, sand and gravel, for example, are discharged from the partly liquid filled receiving trough with the aid of a bucket wheel. Those aggregates are emptied into a second conveying apparatus comprising a conveying conduit which extends transversely to the horizontal and a conveying screw which is disposed in that conduit. Disadvantages of this configuration which the high costs for the second conveying means and the large constructional area for the separator.

DE 39 06 645 C2 discloses a separator having a conveying screw which is disposed in a receiving trough. At its lower end, the screw has a cylindrical region and, following that, a conical region. The floor of the receiving trough, which is at the cylindrical region or the conveying screw, runs transversely to one horizontal. The separator has only a small water bath, whereby its capacity, and the quality of extractive washing, are low.

SUMMARY OF THE INVENTION

It is the object of the invention to provide a separator with which a good extractive washing performance can be achieved by means of a simple construction.

To achieve this object a separator comprises a conveying screw which is disposed in a receiving trough. The rotary axle of the screw extends transversely to the horizontal. The diameter of the conveying screw increases starting from its lower upstream end. The section of the floor of the receiving trough, at which the enlarged region of the conveying screw is located, extends essentially horizontal. This configuration enables a large volume liquid bath, especially a water bath, to be realized in the receiving trough. A large water bath enables the capacity and extractive wash quality of the separator to be improved. In other words, large quantities of material can be treated in a relatively short time with preferably consistently good extractive washing performance. This shortens the waiting times at the separator which is employed, for example, in ready-mix concrete plants. It should also be noted that the quality of extractive washing can be improved considerably by using a larger volume water bath. A further advantage is the simplicity of construction of the separator.

In an advantageous development of the invention, the conveying screw has, following the first lower screw section in the downstream direction, a second upper screw section with a decreasing diameter in the conveying direction of the conveying screw. The conveying screw therefore has two conical screw sections with larger diameter that face one another. This makes it possible to ensure a desired height of the gap formed between the turns of the conveying screw sections and the respective floor region of the conveying trough. Because the turns of the conveying screw are spaced at a distance from the floor of the receiving trough, only the solid components of the material, such as sand and gravel, are conveyed by means of the conveying screw to a discharge region, whereas the liquid used for extractive washing, especially water, is able to flow essentially freely back and forth in the receiving trough.

In a preferred embodiment of the separator, the conically tapering second screw section of the conveying screw is followed by a third, cylindrical screw section with a small diameter, in one advantageous variant. Transfer of the material transported by the conveying screw from the extractive washing region to the third screw section of the conveying screw is accomplished by a transfer apparatus comprising, for example, a bucket wheel, which Is located between the second screw section and the third screw section of the conveying screw. The transfer apparatus helps carry the material out of the extractive washing region of the receiving trough, transports it upward and passes it to the cylindrical screw section of the conveying screw, which transports the washed material further in the direction of a discharge region of the separator.

To achieve the object, another embodiment of a separator comprises a conveying screw with a rotary axis that extends transverse to the horizontal. The conveying screw is disposed in a receiving trough and comprises a first cylindrical screw section of larger diameter and a second cylindrical screw section of smaller diameter with a transfer apparatus between the sections. Both screw sections of the conveying screw have a common rotary axis which extends rectilinearly. The washed material, which is transported by rotation of the conveying screw from the larger diameter cylindrical screw section of the conveying screw to the transfer apparatus, is conveyed vertically upward by means of the transfer apparatus. That apparatus comprises a bucket wheel, for example. The material is raised into the region of the smaller diameter screw section of the conveying screw, which then transports the material in the direction of the discharge region by rotation of the driveable, common rotary axle. This construction of the separator, which is simple, is able to achieve good extractive washing performance.

A particularly preferred embodiment of the separator includes a holdup disk, which is preferably attached, by being fixed in terms of rotation, to the rotary axle of the conveying screw. The disk is disposed between two screw sections of the conveying screw and the disk is such that a gap is formed between the holdup disk and the floor of the receiving trough. The holdup disk which rotates together with the rotary axle of the conveying screw, divides the receiving trough into a prewash/buffer region and a washing region or into a washing region and a discharge region. The holdup disk therefore prevents rapid transport of large quantities of the material to be separated through the individual regions of the receiving trough. This configuration enables the washing region to be charged continuously with material to be washed without need for the individual regions on the conveying trough to be separated hermetically from one another. The holdup disk is preferably disposed on the rotary axle of the conveying screw and effectively forms a partition. The disk is disposed at a distance from the floor of the receiving trough, so that the material can be transported from one region of the receiving trough into the adjacent region only through the gap. The amount of material shifted through the gap per unit time is dependent, inter alia, on the gap height. The holdup disk makes it possible to practically rule out separator overload, because the material can only be transported further in a metered quantity.

Finally, a preferred embodiment of the separator has a receiving trough of double-wall design. The intermediate space between the walls is filled with a liquid and/or gaseous medium, for example, with air. In that case, the insulating air cushion prevents the separator, and especially the water which is used to wash the material in the separator from freezing. Even at temperatures below freezing, therefore, it is possible to ensure flawless operation of the separator.

Other features and advantages of the present invention will become apparent from the following description of the invention which refers to the accompanying drawings.

BRIEF DESCRIPTION OF THE DRAWINGS

FIGS. 1 to 3 each show a longitudinal section through an exemplary embodiment of a separator for separating curable material into defined individual components;

FIGS. 4 and 5 each show a longitudinal section through an exemplary embodiment of an additional conveying apparatus which can be attached to a housing of the separator described with reference to FIGS. 1 to 3, and FIG. 6 shows a cross section through an exemplary embodiment of a receiving trough of a separator.

DETAILED DESCRIPTION OF THE INVENTION

The separator described below can be employed in general for separating curable material which includes liquid. The curable material is, for example, concrete, mortar, and the like, which has not yet set.

Figure 1:
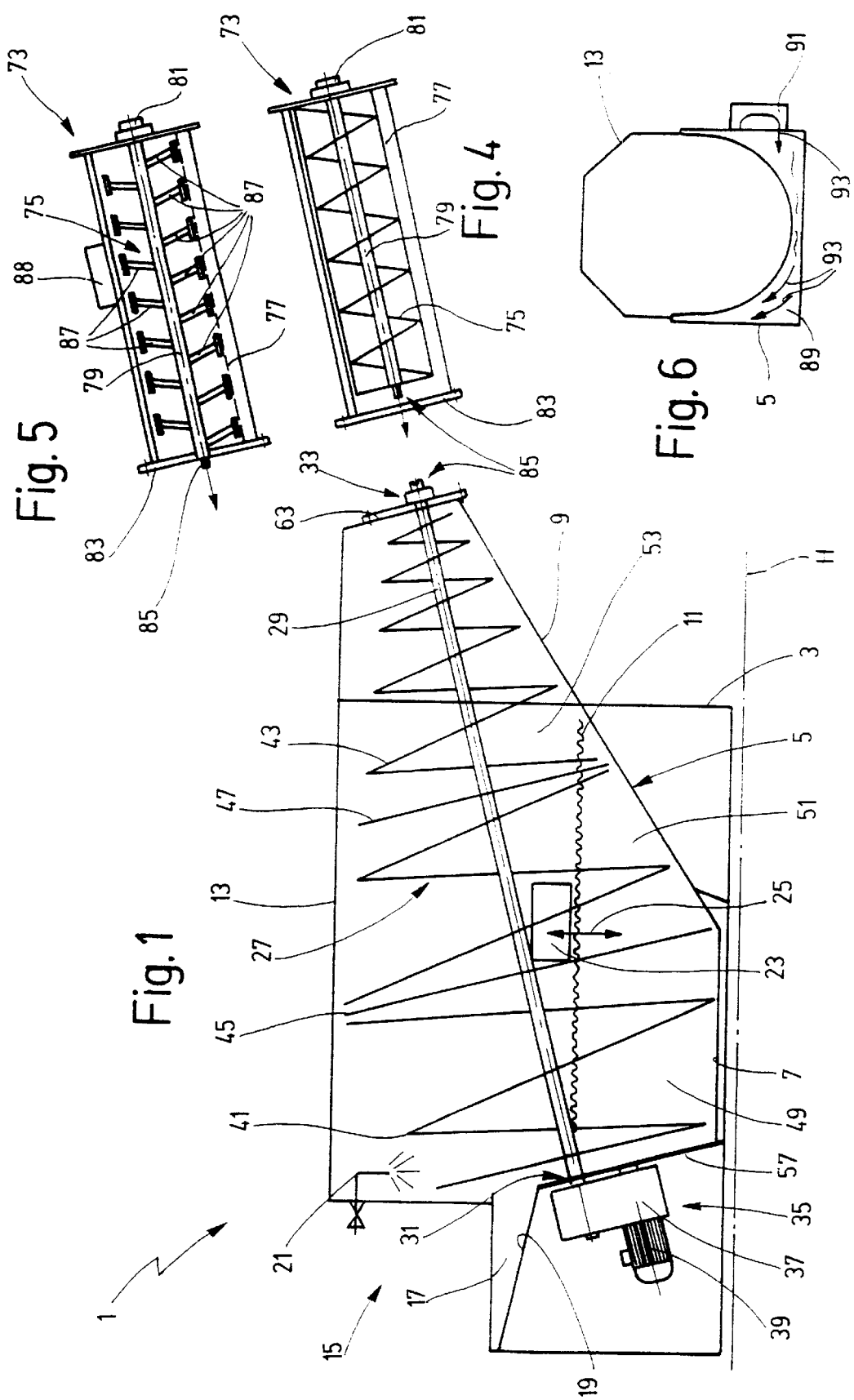

FIG. 1 schematically shows a longitudinal section through an exemplary embodiment of a separator 1 which comprises a receiving trough 5 mounted on a frame 3. The floor of the receiving trough 5 has a first, lower wall section 7 which extends parallel or essentially parallel to the imaginary horizontal H depicted by a dashed line. The floor of the receiving trough 5 additionally comprises a second wall section 9, which extends transversely to the horizontal H and abuts the first wall section 7 of the floor at an obtuse angle. The receiving trough 5 is closed off at the end face, at least at its lower end. It is partly filled with a liquid which subjects the material to be separated to extractive washing. In general, water is used for this purpose. The surface of the water is indicated with a wavy line 11. The receiving trough 5 can be closed off with a lid 13, which in this case is shown as hood shaped and which, in a preferred variant, comprises a plurality of segments designed such that they can be folded up individually. There is a feed hopper 17 at one end face 15 of the separator 1 into which the material to be separated is introduced and from which it passes into the water bath through a chute 19. A fresh water supply port 21 additionally provided at the end face 15 enables fresh water to be added, preferably in a cycle, to the receiving trough 5 during extractive washing.

The water in the receiving trough can flow off from the receiving trough 5 through a drain 23. In this embodiment, the drain 23 is adjustable in height, as indicated by a double arrow 25. As a result the volume of the water bath in the receiving trough 5 can be adjusted as a function, for example, of the nature of the material and the height of the water level can also be adjusted. The separator is designed so that displacement of the water is preferably just high enough such that only the suspended components, such as cement and fines below 0.3 mm, are washed out of the receiving trough 5 together with the water. The wash water which flows off through the drain 23, which is also referred to as residual water, flows together with the fines into a tank in which either the fines settle or are prevented from settling by a circulation apparatus. The residual/wash water can be removed from this tank and used to produce fresh material, especially concrete, mortar and the like.

A conveying screw 27 within the receiving trough 5 has a straight rotary axle 29 that extends transversely to the horizontal H. The conveying screw 27 is mounted at both ends by two bearings 31 and 33, which are disposed outside the receiving trough 5. This prevents contact with the material to be washed and with the water, which is aggressive as a result of the substances that have been washed out, e.g. cement. The turns of the conveying screw 27 are disposed at a distance from the floor of the receiving trough 5, which is also referred to as the extractive washing trough. This ensures that gravel, sand and other solid constituents that have settled on the floor of the receiving trough 5 are moved on in the conveying direction of the conveying screw 27 while the water is able to flow back and forth within the receiving trough 5. The water, therefore, is not conveyed to the discharge region of the separator by the screw 27.

The rotary axle 29 of the conveying screw 27 can be rotated by a drive apparatus 35, which in this case is disposed below the feed hopper 17. In this embodiment, the drive apparatus 35 comprises a gear mechanism 37 and an electric motor 39. FIG. 1 shows that the conveying screw 27 has two conical shape screw sections 41 and 43, arranged so that their larger diameter ends are arranged opposite one another at a distance. Starting from the lower or upstream end of the conveying screw 27, there is an increase in the diameter of the conveying screw 27 in the first lower screw section 41, to which the essentially horizontally extending first floor section 7 of the floor of the receiving trough 5 is also assigned.

The second upper screw section 43 follows the first screw section 41 and decreases in diameter as viewed in the conveying direction of the conveying screw 27. Between the first lower screw section 41 and the second upper screw section 43, there is a first holdup disk 45 which is connected fixed for rotation to the rotary axle 29 of the conveying screw 27. A further second holdup disk 47 is downstream a distance from the first holdup disk 45 and is integrated into the second screw section 43, which in this case is of two-part design. The second holdup disk 47 is likewise connected fixed for rotation to the rotary axle 29. The respective external diameters of the holdup disks 45, 47 are chosen so that a gap is formed between the outside of the holdup disks and the respective opposing floor section of the receiving trough floor. The height of the gap is preferably at least 30 mm and can be even greater, in particular much greater.

The holdup disks 45 and 47 divide the conveying screw 27, or the receiving trough 5, into three regions, namely a prewash and buffer region 49, a wash region 51, and a discharge and dewatering region 53. The holdup disks 45, 47 make it possible to reliably prevent overload of the separator 1 as a consequence of an excessive quantity of material introduced into the receiving trough 5, since because of the gap between the holdup disks and the floor of the receiving trough 5 only a certain quantity of material can be shifted through with the aid of the conveying screw.

In FIG. 1, the first screw section 41 is arranged at a small distance from the feed hopper 17 and from the end of the chute 19. This configuration causes that end of the screw section 41 that faces the feed hopper to act like a holdup element, which prevents an unacceptably large quantity of material passing at once from the feed hopper into the receiving trough. In this embodiment, therefore, the material can pass into the receiving trough only through the gap between the wall 57, which closes off the receiving trough at the end face, and the screw section 41 of the conveying screw.

Figure 2:
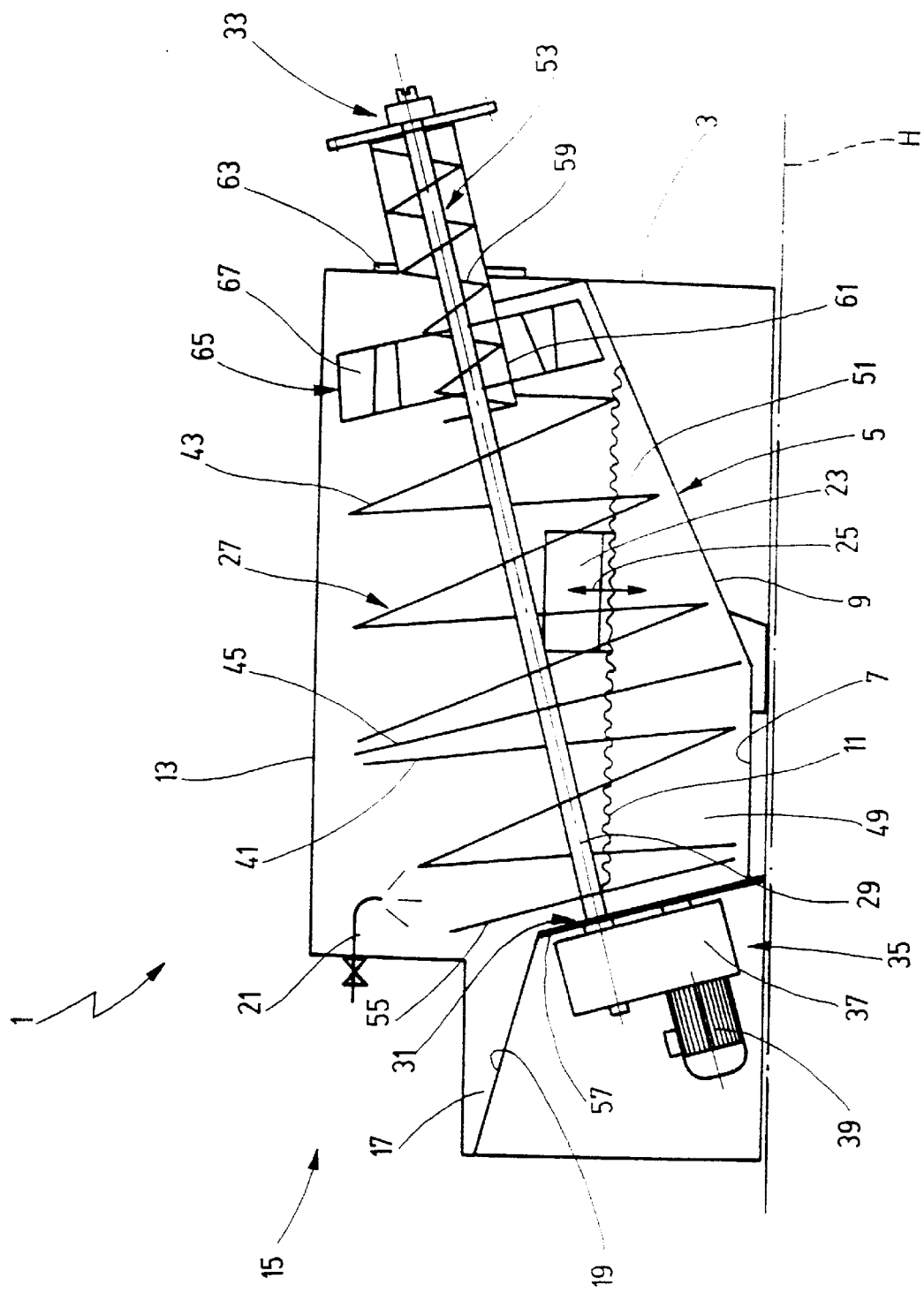

FIG. 2 schematically shows a second embodiment of the separator 1 in longitudinal section. Parts which correspond to those described with reference to FIG. 1 have the same reference numerals and were described relating to FIG. 1. Only the differences are dealt with in detail. At the lower end of the conveying screw 27 there is a holdup disk 55, which is arranged at a small distance from a wall 57, which closes off the end face of the receiving trough 5, and is connected to the rotary axle 29. Material introduced into the feed hopper 17 passes via the chute 19 into the gap between the holdup disk 55 and the wall 57 and drops through this gap into the water bath. The rotating holdup disk 55 makes it possible to prevent overload of the separator 1, since if a large quantity of material is introduced into the feed hopper 17, it is actually retained in the feed hopper 17. Therefore, a metered amount of material per unit time is supplied even to the prewash region 49 of the separator 1, to ensure a desired washing.

In the embodiment in FIG. 2, the conveying screw 27 has a third screw section 59 which is in the discharge region 53 and is downstream, as seen in the conveying direction of the conveying screw 27, of the second, conical screw section 43. The third screw section 59 is cylindrical not conical, and its diameter is much smaller than the diameter of the screw sections 41, 43. The screw section 59 is also connected in a fixed manner to the rotary axle 29 and is disposed in a conveying conduit 61 which is fastened by a flange plate 63 to the frame 3 of the separator 1.

There is a transfer apparatus 65 between the conical screw section 43 and the cylindrical screw section 59 which raises the material (gravel, sand) that has been conveyed to the upper end of the washing region 51 of the receiving trough 5 out of the receiving trough 5 so that it can be introduced into the conveying conduit 61, which projects into the receiving trough 5. In this embodiment, the transfer apparatus 65 comprises a bucket wheel 67 having a plurality of buckets which are preferably detachably connected to the bucket wheel 67. The bucket wheel 67 is fixedly connected to rotate with the rotary axle 29 of the conveying screw 27, enabling a simple construction to be provided.

The separator functions as follows. Rotation of the rotary axle 29 washes the material to be separated in the large water bath. During rotation of the conveying screw 27, the cement is washed to remove gravel and sand. The solid components of the washed material, which have settled on the receiving trough floor, are transported with the aid of the screw sections 41 and 43 into the upper part of the wash region 51. With the aid of the bucket wheel 67, the material is lifted out of the receiving trough 5, 51 and is transported upward to the conveying conduit 61, in which the upper part (third screw section 59) of the conveying screw 27 is disposed. The buckets of the bucket wheel 67 are emptied in the region of the apex of the bucket wheel and the contents of the buckets, i.e., the material, passes into the conveying conduit 61, which is disposed below the discharge point of the bucket conveyor. The conduit 61 extends transversely to the horizontal and has a floor which extends essentially parallel to the rotary axle 29 of the conveying screw 27.

A particular advantage of the embodiments in FIGS. 1 and 2 is the large volume of water bath in the receiving trough 5. This can considerably improve the quality of extractive washing by the separator 1. Moreover, the capacity of the separator to receive material for separation is increased relative to that of prior art separators. A further advantage is that the space required for the separator is no greater than for conventional separators. At a given receiving capacity and extractive wash quality, the separator of the invention has a smaller construction than a known separator. The separators in accordance with FIGS. 1 and 2 are notable in particular for simplicity of construction.

Parts depicted in FIG. 3 that correspond to the parts described with reference to FIGS. 1 and 2 are provided with the same reference numerals, and they are described with reference to those preceding Figures.

Figure schematically 3 shows a development of a separator 1, in longitudinal section, which differs from the separator of FIG. 2 essentially as to the conveying screw 27. The rotary axle 29 in FIG. 3 extends transversely to the horizontal H. Its lower or upstream region has a cylindrical screw section 69 of larger diameter. At its upper downstream end it has a cylindrical screw section 59 of smaller diameter. There is also a transfer apparatus 65 between the two cylindrical screw sections 69 and 59. The floor of the receiving trough 5 has a wall section 71 which is essentially planar and extends transversely to the horizontal H. The turns of the conveying screw 27 or of the screw section 69 are at a distance from the wall section 71. The floor of the receiving trough 5 and the floor of the conveying conduit 61 extend essentially parallel to the rotary axle 29 of the conveying screw 27. The separator 1 in FIG. 3 is notable particularly for having two screw sections 59 and 69 with a common, rectilinearly extending, rotary axle 29, which simplifies the construction of the separator without affecting the quality of extractive washing. In this embodiment, the conveying conduit 61 is integrated into the frame 3.

FIG. 4 is a schematic diagram of a first embodiment of a second conveying apparatus 73, which is a modular unit and which can be fastened to the separator 1 in order to increase the discharge height, or the height of the discharge aperture of the separator 1. The conveying apparatus 73 comprises a cylindrical conveying screw 75 which is disposed in a conveying conduit 77. The rotary axle 79 is held rotatably at one end by a bearing 81. In the region of the upper end of the rotary axle 29 of the conveying screw 27, the conveying apparatus 73 can be fastened by a flange plate 83. The rotary axle 79 of the conveying screw 69 can be connected to the rotary axle 29 of the conveying screw 27 by a coupling 85 such that the rotary axles 79 and 29 are flush with one another. This makes the rotary axle 79 an extension of the rotary axle 29. In the mounted state of the conveying apparatus 73, the axle 79 is likewise driven by the drive apparatus 35 for the rotary axle 29.

FIG. 5 shows a schematic diagram of a second embodiment of a conveying apparatus 73, in longitudinal section. It differs from the conveying apparatus in FIG. 4 in that the conveying screw 75 is comprised of a plurality of screw segments 87 connected to the rotary axle 79. In addition, the floor of the conveying conduit 77 comprises a screen floor, that is, the floor has a number of passages of defined cross section through which certain components of the material, such as sand, are able to fall, whereas larger parts, such as gravel, are transported on to a discharge region with the aid of the conveying screw. In the embodiment of a conveying apparatus 73 depicted in FIG. 5, a vibrating apparatus 88 is provided, which moves the conveying apparatus 73, especially the screen floor, in an oscillating manner, that is, it can be set in oscillation, so that the discharge of fine components is assisted by the screen floor.

FIG. 6 shows a cross section through an embodiment of a receiving trough 5, as described with reference to the preceding Figures. Its inside is of semicircular design in its floor region. The receiving trough 5 can be closed off at the top by a hood like lid 13, which is preferably removable. The receiving trough 5 is double walled. An intermediate space 89 is defined between the walls for being filled with a liquid and/or gaseous medium. In the embodiment in FIG. 6, the intermediate space 89 contains air which can be heated by heating apparatus 91. This heating apparatus 91 provides air circulation heating, such that air present in the intermediate space 89 is moved as indicated by arrows 93. The heating of the receiving trough 5 ensures reliable operation of the separator 1 even at freezing temperatures, since it is possible to prevent freezing of the water in the receiving trough 5. In an advantageous variant of the receiving trough, the intermediate space 89 formed by the double outer walls of the receiving trough contains only an unheated air cushion which has an insulating effect, so that freezing of the water in the trough can be prevented at temperatures just a few degrees below freezing and in a simple manner, that is, without the aid of a apparatus.

In summary it can be stated that the separators described above have a simple and cost-effective construction and can be employed in a functionally reliable manner. Moreover, high extractive wash quality can be ensured. The space required for the respective separator is small relative to the receiving capacity of the separator. Another particular advantage is that the second conveying apparatus 73, described with reference to FIGS. 4 and 5, can be attached by flanging to the separator, so that, if required, the conveying height of the separator can be enlarged in an advantageous manner. The rotationally fixed attachments, in the embodiments depicted in FIGS. 2 and 3, of all screw sections 41, 43 and 59 of the conveying screw 27 and of the bucket wheel 67 to the same rotary axle 29 makes a particularly simple and cost-effective construction of the separator possible. Yet another advantage is that, through separation of the curable residual material into individual components, the economy of the production plant producing the material (concrete, mortar and the like) is increased and landfill space can be saved, since virtually all components of the residual material can be used again.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A separator for separating curable material that includes liquid, the separator comprising:

a receiving trough for receiving the curable material including liquid and a liquid mixable with the curable material;

a conveying screw disposed in the receiving trough; a rotary axle of the conveying screw, the axle extending transversely to the horizontal; the conveying screw having an upstream and a downstream end, the conveying screw increasing in diameter starting from the upstream end toward the downstream end over at least a portion of the conveying screw;

the receiving trough having a floor beneath the conveying screw and a section of the floor beneath the increasing diameter portion of the conveying screw and the floor section extending essentially horizontally.

2. The separator of claim 1, wherein the rotary axle of the conveying screw extends upwardly from the upstream toward the downstream end.

3. The separator of claim 2, wherein the conveying screw has a first upstream section which is the section of increasing diameter, a second section of the screw downstream of the first increasing diameter section, and the second screw section has a decreasing diameter downstream in the conveying direction.

4. The separator of claim 1, wherein the conveying screw has a first upstream section which is the section of increasing diameter, a second section downstream of the first increasing diameter section, and the second screw section has a decreasing diameter downstream in the conveying direction.

5. The separator of claim 4, wherein the floor of the receiving trough has a second section below the second screw section and the second floor section extends transversely to the horizontal in the direction corresponding to the decreasing diameter of the second screw section.

6. The separator of claim 5, further comprising a third cylindrical screw section located downstream of the second screw section for receiving conveyed material from the second screw section and conveying the material further downstream.

7. The separator of claim 6, wherein the rotary axle extends through the first and second screw sections; and the third screw section has a rotary axle that is an extension of the rotary axle of the conveying screw.

8. The separator of claim 6, further comprising a curable material transfer apparatus between the second screw section and the third screw section for transferring the curable material from the trough at the second screw section to the third screw section.

9. The separator of claim 1, wherein the receiving trough includes a drain for liquid from the trough and the drain being adjustable in height on the trough for determining the volume and height of the liquid in the trough.

10. The separator of claim 1, wherein the trough is double walled with an inner wall toward the curable material and an outer wall outward of the inner wall, and the walls being positioned for defining an intermediate space between the walls which is fillable with a liquid or gaseous medium.

11. The separator of claim 10, further comprising heating apparatus for heating the medium between the walls.

12. The separator of claim 1, further comprising a second conveying apparatus attachable to the downstream end of the conveying screw for further conveying the curable material from the first conveying screw to the second conveying apparatus.

13. The separator of claim 12, wherein the second conveying apparatus comprises a second conveying screw and a second conveying conduit in which the second conveying screw is disposed for conveying the material by the second conveying apparatus.

14. The separator of claim 13, wherein the second conveying apparatus has a respective second rotary axle and the rotary axle of the conveying screw and the second rotary axle of the second conveying screw of the second conveying apparatus are couplable together.

15. The apparatus of claim 13, wherein the conveying conduit of the second conveying apparatus has a floor in the form of a screen preventing passage of some material therethrough.

16. The separator of claim 15, further comprising vibrating apparatus connected with the second conveying apparatus for setting the second conveying apparatus and including the floor thereof in oscillation.

17. The separator of claim 1, further comprising a feed hopper for curable material disposed upstream of the conveying apparatus.

\* \* \* \* \*